No. 736,480. Patented August 18, 1903.

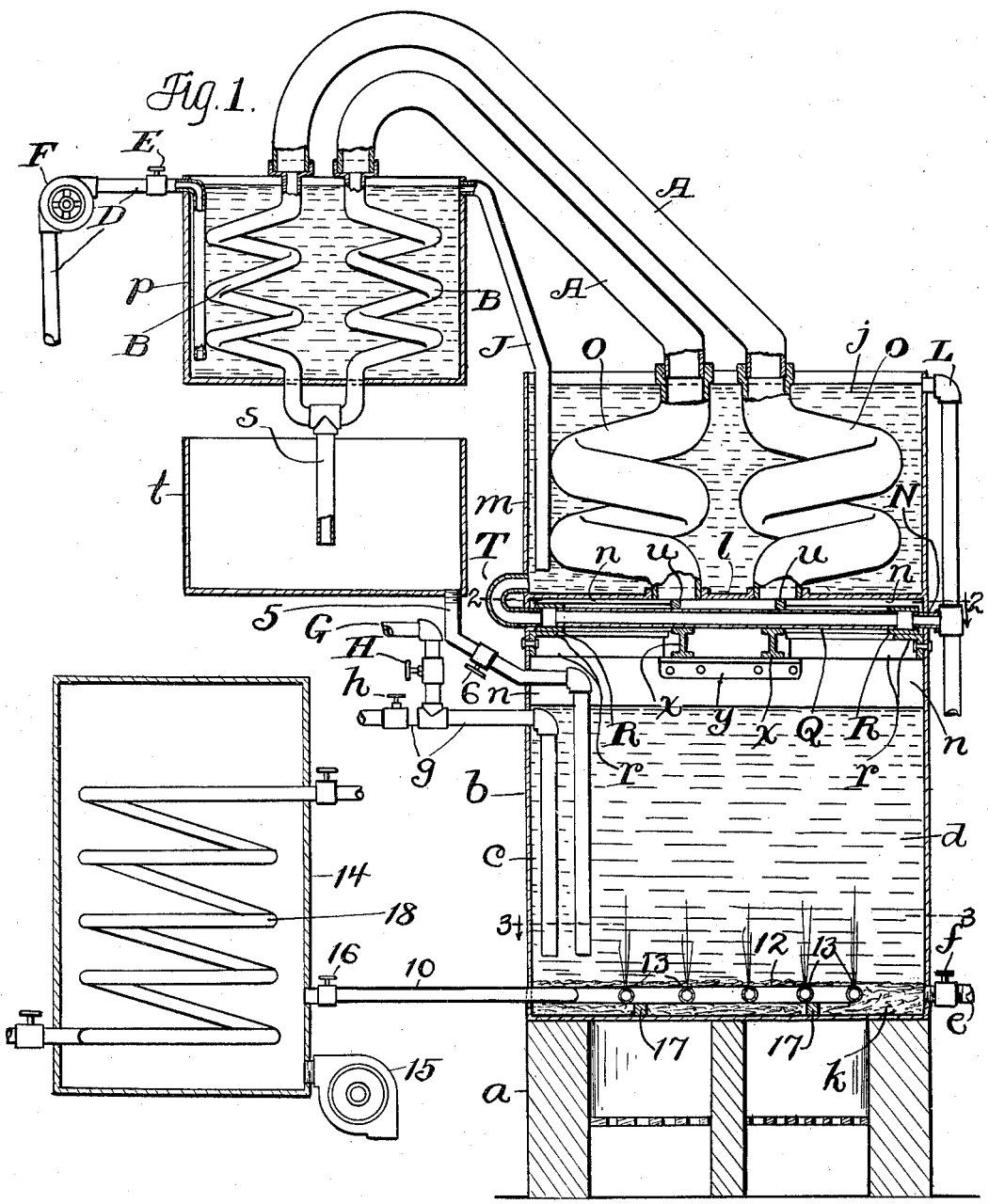

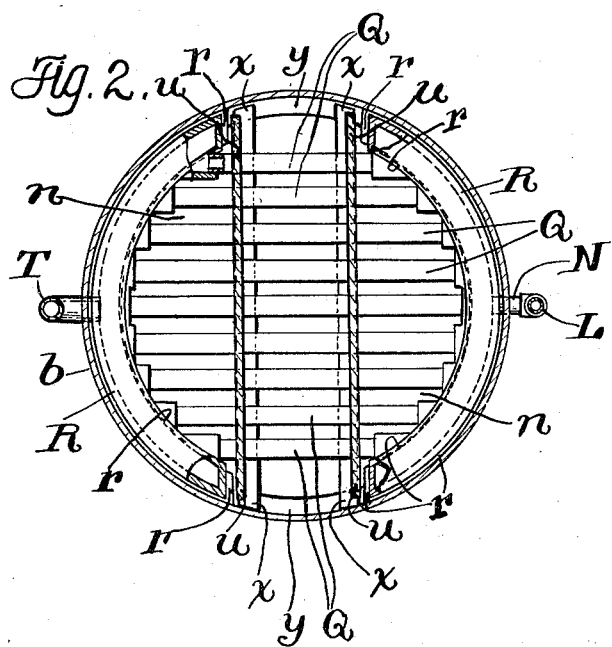
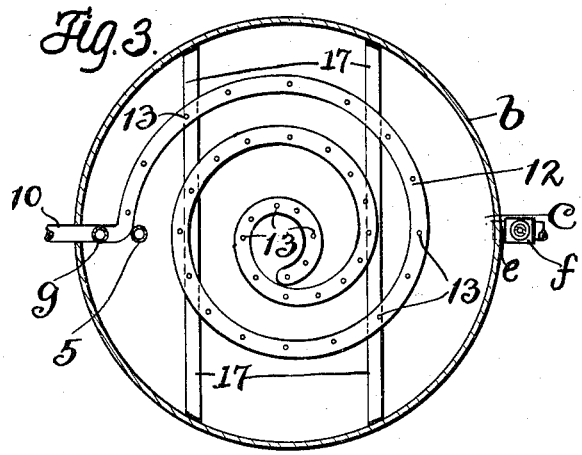

UNITED STATES PATENT OFFICE.

FRIEDRICH BERG, OF WARRENSVILLE, OHIO.

APPARATUS FOR DEODORIZING OR PURIFYING PETROLEUM.

SPECIFICATION forming part of Letters Patent No. 736,480, dated August 18, 1903.

Application filed December 29, 1902. Serial No. 136,955. (No model.)

*To all whom it may concern:*

Be it known that I, FRIEDRICH BERG, a citizen of the United States of America, residing at Warrensville, in the county of Cuyahoga and State of Ohio, have invented certain new and useful Improvements in Apparatus for Deodorizing or Purifying Petroleum; and I hereby declare the following to be a full, clear, and exact description of the invention, such as will enable others skilled in the art to which it pertains to make and use the same.

This invention relates to improvements in apparatus for deodorizing or purifying crude petroleum and its products containing sulfurous compounds or impurities.

The primary object of this invention is to provide apparatus whereby the crude petroleum or impure product containing sulfurous compounds or impurities can be treated to economically effect a material increase in the production or yield from a given body of the crude oil or impure product of the highest grade of illuminating-oil.

Another object is to render the apparatus durable and simple in construction.

With these objects in view the said invention consists in certain features of construction and combinations of parts hereinafter described, and pointed out in the claims.

In the accompanying drawings, Figure 1 is a side elevation, mostly in section, of apparatus embodying the said invention. Fig. 2 is a horizontal section taken through the tank $b$ on line 2 2, Fig. 1, and portions are broken away in Fig. 2. Fig. 3 is a horizontal section taken through the said tank on line 3 3, Fig. 1.

Referring to the drawings, $a$ designates a furnace employed to heat the oil supplied to the purifying-chamber $c$, which is formed by and within the lower and central portion of a tank $b$, and $d$ represents a body of impure oil put into the said chamber for purification and shown only in Fig. 1. The tank $b$ is exposed to the fire-chamber or path of the products of combustion of the furnace $a$. The tank $b$ is provided at the bottom with a drain-pipe $e$, which communicates with the chamber $c$ and has a normally closed valve $f$. The tank $b$ is provided with an oil-feed pipe $g$, which discharges into the said chamber and has a normally closed valve $h$ externally of the tank. The chemicals or substances $k$—such, for instance, as caustic soda in solution—with which the oil is to be deodorized or purified is shown only in Fig. 1 and supplied to the chamber $c$ in any approved manner and can be fed into the said chamber through the pipe $g$ from a pipe G, which connects and communicates with the pipe $g$ between the tank $b$ and the valve $h$. The pipe G is provided with a normally closed valve H. The caustic soda or purifying agent supplied to the chamber $c$ being heavier than the oil settles and forms a layer upon and over the bottom of the said chamber. The tank $b$ extends above the chamber $c$, and a metal diaphragm $l$, which forms the top of the said chamber, is located a suitable distance below the upper extremity of and within the tank and forms the bottom of a water-chamber $m$, supplied with cold water $j$, and closes the chamber $c$ from above. The water-chamber $m$ constitutes a portion of the condensing apparatus employed and necessary to effect a thorough purification of the oil and to cause the crude oil or impure oil product to produce or yield a larger percentage of the highest grade of illuminating-oil than has heretofore been accomplished. It will be observed that the diaphragm $l$ forms not only the bottom of the water-chamber $m$, but also the top or cover of the chamber $c$. The body of oil $d$ which is to be purified does not fill the tank below the diaphragm $l$, so that it forms or leaves a vapor-receiving space $n$ between the level of the said oil-body and the said diaphragm. The vapor-space $n$ is not too shallow, having, preferably, a depth of about twenty inches.

Two vapor-conducting pipe sections or coils $o$ are in open relation at the diaphragm $l$ with the vapor-space $n$, preferably centrally transversely of the tank, and extend from the said diaphragm upwardly and helically or sinuously through the chamber $m$ and at the top of the chamber $m$ connect and communicate with two different pipe-sections A, respectively. Each pipe-section A extends laterally and upwardly to and centrally over a water containing or cooling chamber $p$, arranged at one side of and at an elevation above the water-chamber $m$ and forming a portion of the condensing apparatus. Each pipe-section A above the water-chamber $p$ connects and communicates with a helical or sinuous pipe-section or coil B, which extends through the said chamber in a vertical plane. The two coils or pipe-sections B extend below the chamber $p$, where they connect and communicate with a pipe-section $s$ in common, which discharges into a receptacle $t$.

A pipe 5 is connected and in open relation with the chamber of the receptacle $t$ at the bottom of the said receptacle and thence extends into the lower portion of the said chamber $c$. The pipe 5 is provided between the receptacle $t$ and the tank $b$ with a valve 6.

A water-supply pipe D is provided with a pump F and discharges into the lower end of the chamber $p$. The pipe D has a valve E. A water-conducting overflow-pipe J communicates at its upper and water-receiving end with the upper end of the chamber $p$ and extends and discharges into the lower portion of the chamber $m$.

An overflow-pipe L is in open relation at its upper end with the upper end of the chamber $m$ and extends downwardly externally of the tank $b$ and adjacent to the vapor-space $n$.

Within the vapor-space $n$ and arranged in a horizontal plane, preferably in close proximity to the lower side of the diaphragm $l$, is a considerable number of parallel pipe-sections Q, (see Figs. 1 and 2,) which are arranged in a horizontal plane and extend between and connect together and communicate with two corresponding manifolds or pipe-fittings R, which are arranged in a horizontal plane within opposite sides, respectively, of the said vapor-space. The manifolds R extend circumferentially of the tank $b$, are closed at the ends, and rest upon angle-bars $r$, which are secured to the said tank. One of the manifolds R is placed in open relation centrally between its ends with the pipe L by a short pipe-section N, and the other manifold R is placed in open relation centrally between its ends and by a curved pipe T with the chamber $m$ at the bottom of the said chamber.

Two bars $u$ are interposed between the pipe-sections Q and the diaphragm $l$, preferably centrally of the lower ends of the different coils or pipe-sections $o$. The bars $u$ are arranged at right angles to the pipe-sections R, which rest upon two parallel beams $x$, which are arranged, preferably, about directly below and parallel with the bars $u$. The beams $x$ rest upon angle-plates $y$, which are secured to the tank $b$. It will be observed, therefore, that the manifolds R, pipe-sections Q, diaphragm $l$, and coils or pipe-sections $o$ are inexpensively and efficiently supported from below, and the construction illustrated and described accommodates the use of a diaphragm $l$ which is comparatively thin.

An air-conducting pipe 10 (see Figs. 1 and 3) extends into the lower end of the chamber $c$ and terminates within the said chamber in a perforated spiral coil 12, having upwardly-discharging orifices 13. The pipe 10 communicates with the chamber of a compressed-hot-air reservoir 14, and a pump 15 discharges into the said reservoir and is operated whenever required to maintain the air within the said reservoir under the pressure desired. The pipe 10 is provided between the reservoir 14 and the tank $b$ with a normally closed valve 16. The coil 12 rests upon two parallel bars 17, which rest upon and extend transversely of the bottom of the chamber $c$.

A steam radiator or heater 18 is contained within the reservoir 14 and operated in any approved manner.

The operation of the hereinbefore-described apparatus is as follows: The crude petroleum or crude oil which is to be deodorized or purified is run into the chamber $c$ through the pipe $g$ upon opening the valve $h$ until the oil-level rises to within about fifteen inches of the pipe-sections Q. The caustic soda or purifying agent $k$ may be fed into the said chamber through the said pipe $g$ from the pipe G upon opening the valve H or in any other approved manner. The furnace $a$ is then fired until the temperature of the oil is from 250° to 300° Fahrenheit and kept fired to maintain the said temperature during the operation of the apparatus, so as to vaporize the oil within the chamber $c$. The valves $h$ and H are of course closed when the chamber $c$ has been supplied with the oil and purifying agent. Preparatory to the vaporizing of oil within the chamber $c$ the valve E of the pipe D is opened, if not already open, to permit the pumping of water into the chamber $p$ to cool the pipe-sections or coils B and keep the said pipe-sections cool during the operation of the apparatus. The chamber $p$ becomes filled with water, and thereupon water overflows from the said chamber, through the pipe J, into the chamber $m$ to cool the coils or pipe-sections $o$ and the diaphragm $l$. Water flows from the chamber $m$, through the pipe T, into the adjacent connected manifold R and thence through the pipe-sections Q into the other manifold R and from the latter, through the pipe-section N, into the pipe L. The pipe-section N is smaller diametrically and has consequently less capacity than the pipe T, so that the pipe-sections Q and manifolds R are soon filled with and kept full of water during the operation of the apparatus, and the chamber $m$ also fills with and is kept full of water, and water as soon as the water-level within the chamber $m$ rises opposite the upper end of the pipe L flows off through the said pipe. It will be observed, therefore, that the chambers $p$ and $m$ and the manifolds R and pipe-sections Q remain full of water as soon as filled with water during the operation of the apparatus, and as cold water is permitted to continually flow into the lower end of the chamber $p$ there obtains a circulation of water upwardly through the chamber $p$ and from the said chamber $p$ through the pipe J into the lower end of the chamber $m$ and upwardly through the said chamber $m$ and downwardly from the lower end of the said chamber $m$ through the pipe T and connected manifolds R and pipe-sections Q. The chamber $m$ and the manifolds R and pipe-sections Q are consequently kept supplied with cold water, and the manifolds R and the pipe-sections Q, arranged within the vapor-space $n$ below the comparatively thin diaphragm $l$, participate in the formation of an immensely powerful condensing apparatus.

The oil-vapors and alkali-vapors which arise from the body of oil undergoing treatment within the chamber $c$ impinge against the cool pipe-sections Q, manifolds R, and diaphragm $l$ and are largely condensed or liquefied by thus impinging against the said pipe-sections and manifolds and are almost entirely condensed or liquefied by the combined condensing powers of the said diaphragm, manifolds, and pipe-sections. The escape of vapors from the vapor-space $n$ into the coils or pipe-sections $o$ is almost entirely avoided, and consequently the purifying agent is utilized advantageously and economically, and the decomposition of sulfurous compounds or impurities in the oil undergoing purification is economically carried on to such an extent that a material increase in the percentage of high-grade illuminating-oil obtained from any given body of crude oil is obtained. Any condensable vapors or gases which may escape condensation within the vapor-space $n$ and air ascending through the body of oil and through the said space upon opening the valve 16 of the pipe 10 to permit heated air under pressure to the oil-body through the perforated coil 12 rise into the coils or pipe-sections $o$. Any liquid resulting from condensation of gases or vapors within the coils or pipe-sections $o$ flows adown the said pipes back to the body of oil within the chamber $c$. Any condensable vapors or gases which may escape condensation within the pipes $o$ pass into the coils B, wherein they will likely be condensed or liquefied, and the small or inconsiderable quantity of liquid resulting from condensation in the coils B will gravitate through the pipe $s$ into the receptacle $t$, whence the said liquid is conducted to the chamber $c$ through the pipe 5 upon opening the valve 6.

The diaphragm $l$ being thin and composed, preferably, of a thin sheet-metal plate secured in place in any approved manner has considerable condensing power, and the said diaphragm and the load thereon is ably supported, as hereinbefore described.

All joints where leakage must not occur are of course suitably packed or rendered fluid-tight; but packing of joints is too well known to require description and illustration in this application.

What I claim is—

1. The combination, with a tank forming a vaporizing-chamber having a top, a pipe extending upwardly from said top and communicating with the vapor-space forming upper portion of the said chamber, and means for heating the said chamber, of two manifolds arranged within opposite sides of the said upper portion of the said chamber and extending circumferentially of the chamber near the aforesaid top, parallel pipe-sections extending and establishing communication between the said manifolds and arranged a short distance apart laterally, means for conducting water into one of the said manifolds centrally between the ends of the respective manifold, means for conducting water from the other manifold centrally between the ends of the last-mentioned manifold, and means for supporting the said manifolds and the aforesaid pipe-sections from the tank.

2. The combination, with a tank forming a vaporizing-chamber having a top, a pipe extending upwardly from said top and communicating with the vapor-space forming upper portion of the said chamber, and means for heating the said chamber, of two manifolds arranged within opposite sides of the said upper portion of the said chamber and extending circumferentially of the chamber near the aforesaid top and closed at the ends, pipe-sections extending and establishing communication between the said manifolds, means for conducting water into one of the said manifolds, means for conducting water from the other manifold, angle-bars supporting the manifolds and secured to the tank, a beam instrumental in supporting the aforesaid pipe-sections, and angle-plates supporting the said beam and secured to the tank.

3. The combination, with a tank forming a vaporizing-chamber having a top, a pipe extending upwardly from said top and communicating with the the vapor-space forming upper portion of the said chamber and means for heating the said chamber, of two manifolds arranged within opposite sides of the said upper portion of the said chamber and extending circumferentially of the chamber near the aforesaid top, pipe-sections extending and establishing communication between the said manifolds, means for conducting water into one of the said manifolds centrally between the ends of the respective manifold; means for conducting water from the other manifold centrally between the ends of the last-mentioned manifold, angle-bars supporting the manifolds and secured to the tank, I-beams arranged below and extending transversely of and instrumental in supporting the aforesaid pipe-sections, and angle-plates supporting the said beams and secured to the tank.

4. The combination, with a tank forming an oil-vaporizing chamber having a top, a pipe extending upwardly from said top and communicating with the vapor-space forming upper portion of the said chamber, and means for heating the said chamber, of pipe-sections arranged and supported within the upper portion of the said chamber near the aforesaid top, means for effecting a flow of water or cooling agent through the said pipe-sections, a compressed-air reservoir externally of the vaporizing-chamber, means for heating the air supplied to the said reservoir, a spiral coil arranged within the lower end of the said chamber and having upwardly-discharging orifices, and a valved pipe for establishing communication between the said coil and the chamber of the said reservoir.

5. The combination, with a tank, a diaphragm dividing the tank into an upper chamber and a lower chamber, which diaphragm forms the top of the lower chamber and the bottom of the upper chamber, and means for heating the lower chamber, of means for conducting water into the upper chamber, two helical or sinuous pipe-sections extending upwardly through the upper chamber and communicating at their lower ends with the lower chamber, pipe-sections within the upper portion of the lower chamber near the diaphragm, means for effecting a flow of water from the upper chamber into one end of each of the said last-mentioned pipe-sections, and means for conducting water from the opposite ends of the said last-mentioned pipe-sections to the exterior of the tank.

6. The combination, with a tank, a diaphragm dividing the tank into an upper chamber and a lower chamber, which diaphragm forms the bottom of the upper chamber and the top of the lower chamber, and means for heating the lower chamber, of means for conducting water into the lower end of the upper chamber, an overflow-pipe communicating with the upper portion of the upper chamber and extending downwardly, two helical or sinuous pipe-sections extending upwardly through the upper chamber and communicating at their lower ends with the lower chamber, pipe-sections within the upper portion of the lower chamber near the diaphragm, and means for effecting a flow of water from the lower end of the upper chamber, to and through said last-mentioned pipe-sections, to the aforesaid overflow-pipe.

7. The combination, with a tank, a diaphragm dividing the tank into an upper chamber and a lower chamber, which diaphragm forms the bottom of the upper chamber and the top of the lower chamber, and means for heating the lower chamber, of means for conducting water into the lower end of the upper chamber, an overflow-pipe communicating with the upper portion of the upper chamber and extending downwardly, pipes extending upwardly through the upper chamber and communicating at their lower ends with the lower chamber, two manifolds arranged within opposite sides of the upper portion of the lower chamber near the diaphragm, parallel pipe-sections extending and establishing communication between the said manifolds, a pipe or passage-way establishing communication between the lower end of the upper chamber and one of the said manifolds centrally between the ends of the connected manifold, a pipe-section establishing communication between the other of the said manifolds and the aforesaid overflow-pipe centrally between the ends of the connected manifold, bars interposed between the aforesaid parallel pipe-sections and the aforesaid diaphragm and extending transversely of the said pipe-sections, and beams arranged below and extending transversely of and instrumental in supporting the said parallel pipe-sections, which beams are supported from the tank.

In testimony whereof I sign the foregoing specification, in the presence of two witnesses, this 20th day of December, 1902, at Cleveland, Ohio.

FRIEDRICH BERG.

Witnesses:
C. H. DORER,
TELSA SCHWARTZ.